| (12) | United States Patent |
|---|---|
| | Parenti |

(10) Patent No.: US 10,336,177 B2
(45) Date of Patent: Jul. 2, 2019

(54) DRIVE DEVICE AND METHOD OF OPERATING A DRIVE DEVICE

(71) Applicant: Audi AG, Ingolstadt (DE)

(72) Inventor: Riccardo Parenti, Calderara di Reno (IT)

(73) Assignee: AUDI AG, Ingolstadt (DE)

( * ) Notice: Subject to any disclaimer, the term of this patent is extended or adjusted under 35 U.S.C. 154(b) by 326 days.

(21) Appl. No.: 15/216,396

(22) Filed: Jul. 21, 2016

(65) Prior Publication Data

US 2017/0021716 A1    Jan. 26, 2017

(30) Foreign Application Priority Data

Jul. 22, 2015 (DE) .................. 10 2015 009 488

(51) Int. Cl.
  *B60K 6/50* (2007.10)
  *B60K 6/48* (2007.10)
  *B60K 6/387* (2007.10)

(52) U.S. Cl.
  CPC .............. *B60K 6/50* (2013.01); *B60K 6/387* (2013.01); *B60K 2006/4808* (2013.01); *B60K 2006/4825* (2013.01); *B60Y 2200/92* (2013.01); *B60Y 2400/42* (2013.01); *Y02T 10/626* (2013.01); *Y02T 10/6252* (2013.01); *Y10S 903/914* (2013.01); *Y10S 903/915* (2013.01)

(58) Field of Classification Search
  CPC .. B60K 6/50; B60K 6/387; B60K 2006/4808; B60K 2006/4825
  USPC .......................................................... 74/661
  See application file for complete search history.

(56) References Cited

U.S. PATENT DOCUMENTS

| 6,634,986 | B2 * | 10/2003 | Kima .................... | B60K 6/365 475/5 |
| 8,075,436 | B2 * | 12/2011 | Bachmann ............ | B60K 6/365 475/209 |
| 8,408,342 | B2 * | 4/2013 | Wang .................... | B60K 17/00 180/65.265 |

(Continued)

FOREIGN PATENT DOCUMENTS

| CN | 102126425 | 7/2011 |
| CN | 103687741 | 3/2014 |

(Continued)

OTHER PUBLICATIONS

Chinese Search Report dated Mar. 5, 2018 with respect to counterpart Chinese patent application 2016105791963.

(Continued)

*Primary Examiner* — Ha Dinh Ho
(74) *Attorney, Agent, or Firm* — Henry M. Feiereisen LLC

(57) ABSTRACT

A drive device includes a first drive unit and a second drive unit. A transmission unit includes a primary shaft for connection to the first drive unit, a secondary shaft, and at least one gear pair via which the primary and secondary shafts are operatively connectable to one another. Mounted in coaxial relationship to the secondary shaft is a driving gear which is operatively connected to the second drive unit, and mounted in coaxial relationship to the primary shaft is an output gear which meshes with the driving gear. A secondary-shaft coupling device can couple the driving gear directly with the secondary shaft, and a primary-shaft coupling device can couple the output gear directly with the primary shaft.

12 Claims, 1 Drawing Sheet

(56) References Cited

U.S. PATENT DOCUMENTS

| | | | | |
|---|---|---|---|---|
| 8,784,245 B2* | 7/2014 | Ideshio | ............... | B60K 6/36 |
| | | | | 475/5 |
| 8,888,636 B2* | 11/2014 | Ikegami | ............ | B60K 6/365 |
| | | | | 475/207 |
| 2008/0009379 A1 | 1/2008 | Steinwender | | |
| 2012/0266704 A1 | 10/2012 | Sayama | | |

FOREIGN PATENT DOCUMENTS

| | | |
|---|---|---|
| CN | 103702879 | 4/2014 |
| CN | 103786563 | 5/2014 |
| CN | 204123946 | 1/2015 |
| CN | 104589994 | 5/2015 |
| CN | 204323030 | 5/2015 |
| CN | 104742717 | 7/2015 |
| CN | 104742721 | 7/2015 |
| DE | 102006027709 | 12/2007 |
| DE | 102012103367 | 10/2012 |
| DE | 102013201711 | 8/2014 |
| DE | 102013211975 | 8/2014 |
| DE | 102013206176 | 10/2014 |
| FR | 2 699 127 | 6/1994 |

OTHER PUBLICATIONS

Translation of Chinese Search Report dated Mar. 5, 2018 with respect to counterpart Chinese patent application 2016105791963.

* cited by examiner

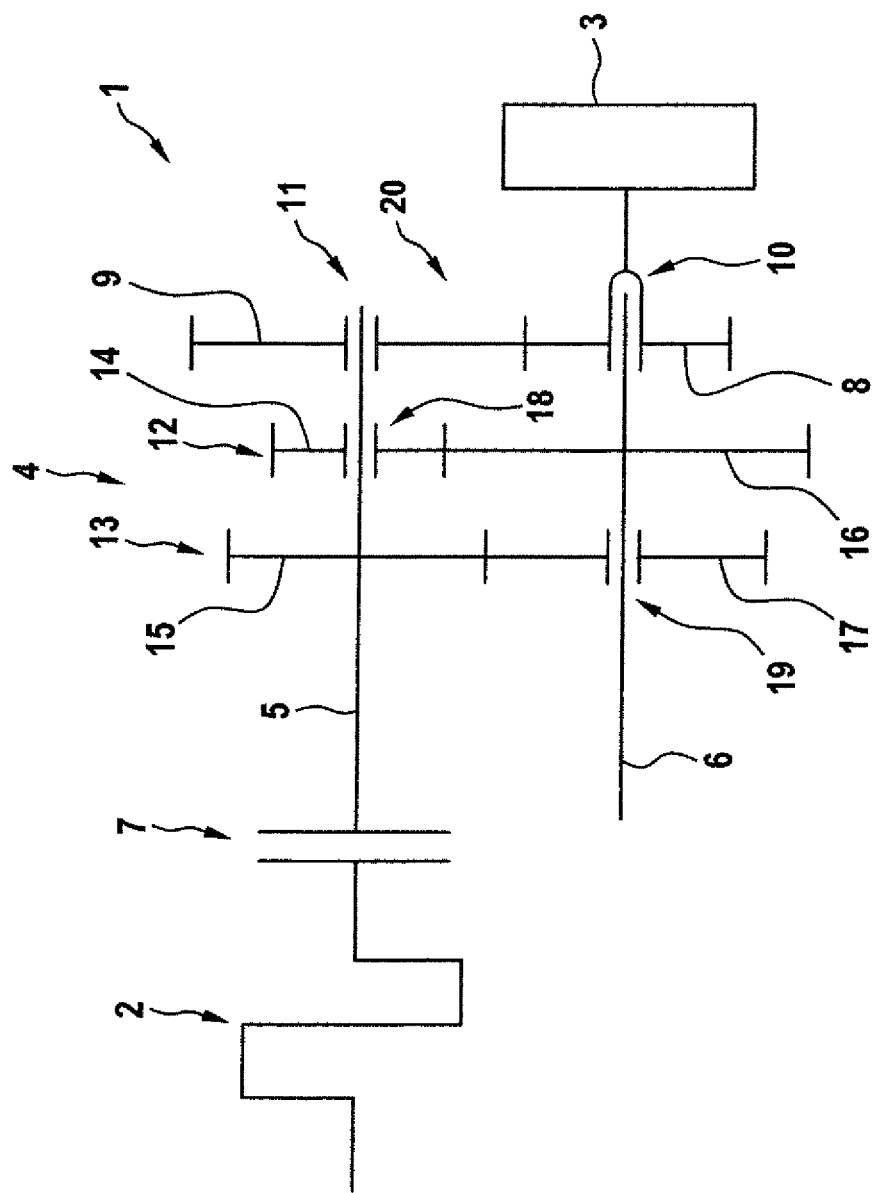

DRIVE DEVICE AND METHOD OF OPERATING A DRIVE DEVICE

CROSS-REFERENCES TO RELATED APPLICATIONS

This application claims the priority of German Patent Application, Serial No. 10 2015 009 488.2, filed Jul. 22, 2015, pursuant to 35 U.S.C. 119(a)-(d), the disclosure of which is incorporated herein by reference in its entirety as if fully set forth herein.

BACKGROUND OF THE INVENTION

The present invention relates to a drive device and to a method of operating a drive device.

The following discussion of related art is provided to assist the reader in understanding the advantages of the invention, and is not to be construed as an admission that this related art is prior art to this invention.

A drive device is used, for example, to provide a drive torque for a motor vehicle, i.e. to provide a drive torque for propelling the motor vehicle. The drive device represents in this case part of the motor vehicle and includes several drive units which may be of a same type, for example constructed as an internal combustion engine or as an electric machine. The drive units may also involve different types so as to provide a hybrid drive device, e.g. one drive unit is an internal combustion engine and another drive unit is an electric machine. In addition to drive units, the drive device includes a transmission unit, e.g. a manually shifted transmission, which has a primary shaft and a secondary shaft. The primary shaft can be coupled with the first drive unit, e.g. in direct operative connection. The secondary shaft is coupled or in direct operative connection with an output shaft of the drive device for example, or forms by itself the output shaft of the drive device. The primary and secondary shafts are connectable to one another via gear pairs with different gear ratios to realize various travel gears.

It would be desirable and advantageous to provide an improved drive device to obviate prior art shortcomings and to provide great flexibility in terms of installation of the drive device.

SUMMARY OF THE INVENTION

According to one aspect of the present invention, a drive device includes a first drive unit, a second drive unit, a transmission unit including a primary shaft for connection to the first drive unit, a secondary shaft, and at least one gear pair via which the primary and secondary shafts are operatively connectable to one another, a driving gear mounted in coaxial relationship to the secondary shaft and operatively connected to the second drive unit, an output gear mounted in coaxial relationship to the primary shaft and meshing with the driving gear, a secondary-shaft coupling device configured to couple the driving gear directly with the secondary shaft, and a primary-shaft coupling device configured to couple the output gear directly with the primary shaft.

In accordance with the present invention, the transmission unit includes at least one gear pair, which may be represented by the driving gear in coaxial relationship to the secondary shaft and the output gear in coaxial relationship to the primary shaft. For example, the driving gear is mounted on the secondary shaft and/or the output gear is mounted on the primary gear. Of course, the driving gear may also be arranged and rotatably mounted in relation to a rotation axis of the secondary shaft axially next to the secondary shaft and the output gear in relation to a rotation axis of the primary shaft axially next to the primary shaft.

The second drive unit is in operative connection with the driving gear, advantageously rigidly and/or permanently. Advantageously, the driving gear can be directly coupled with an output shaft of the second drive unit. The driving gear meshes with the output gear, advantageously permanently. Advantageously, the gear ratio between the driving gear and the output gear is not equal to one. Currently preferred is a gear ratio of less than one, so that the output gear driven by the driving gear has a smaller rotation speed than the driving gear.

Further provided are the secondary-shaft coupling device and the primary-shaft coupling device, with the secondary-shaft coupling device being used for operative connection of the driving gear with the secondary shaft, whereas the primary-shaft coupling device is used for operative connection of the output gear with the primary shaft. Advantageously, the operative connection between the secondary shaft and the driving gear via the secondary-shaft coupling device is rigid. A coupling of the driving gear with the secondary shaft is to be understood as a coupling which is rigid and in fixed rotative engagement. Likewise, the output gear can be operatively connected rigidly by the primary-shaft coupling device with the primary shaft. A coupling between the output gear and the primary shaft relates thus to a rigid coupling in fixed rotative engagement.

Configuration of the transmission unit in this way enables a direct driving of the primary shaft via the first drive unit. The secondary shaft can hereby be driven only indirectly via the first drive unit, that is via the primary shaft and the at least one gear pair. The driving gear and the output gear may hereby represent the gear pair, as described above. Advantageously, the at least one gear pair is, however, provided in addition to the driving gear and output gear in order to operatively connect the primary shaft and the secondary shaft with one another.

The second drive unit is permanently and rigidly operatively connected with the driving gear. As the output gear meshes with the driving gear, there is also established a permanent interaction between the output shaft and the second drive unit. The second drive unit can be coupled either with the primary shaft or with the secondary shaft with the assistance of the primary-shaft coupling device and the secondary-shaft coupling device. Different gear ratios may hereby be provided, when the gear ratio between the driving gear and the output gear deviates from one.

According to another advantageous feature of the present invention, the secondary-shaft coupling device can be configured to fully disengage the driving gear from the secondary shaft in a first switching state, and to engage the driving gear with the secondary shaft in a second switching state. Advantageously, the secondary-shaft coupling device can rigidly engage the driving gear with the secondary shaft in the second switching state. The secondary-shaft coupling device thus has at least two switching states. While the driving gear is decoupled in the first switching state from the secondary shaft, i.e. absent an operative connection with the secondary shaft, such an operative connection is established in the second switching state. Advantageously, the driving gear is connected in the second switching state in fixed rotative engagement or rigidly with the secondary shaft.

According to another advantageous feature of the present invention, the primary-shaft coupling device can be configured to fully disengage the output gear from the primary shaft in a first switching state, and to engage the output gear with the primary shaft in a second switching state. Advantageously, the primary-shaft coupling device can rigidly engage the output gear with the primary shaft in the second switching state. The primary-shaft coupling device thus has also two switching states. In the first switching state, the output gear is fully disengaged from the primary shaft, i.e. absent an operative connection with the primary shaft. Advantageously, the output gear and the primary shaft may operate at different rotation speeds. Conversely, in the second switching state of the primary-shaft coupling device, the output gear is coupled with the primary shaft in fixed rotative engagement or rigidly.

As described above, using the transmission unit, the second drive unit can be used to directly propel either the secondary shaft or the primary shaft. Hereby, it is to be understood that the propulsion is not indirectly established via the respectively other shaft, but the respective shaft is in direct operative connection with the second drive unit and thus runs at the same rotation speed as the second drive unit.

According to another advantageous feature of the present invention, the first drive unit can be constructed as an internal combustion engine and/or the second drive unit can be constructed as an electric machine. Such a configuration has been discussed above and represents a hybrid drive device.

According to another advantageous feature of the present invention, the electric machine includes a rotor shaft which can be arranged in coaxial relation to the secondary shaft. The rotor shaft of the electric machine represents the output shaft of the electric machine and is arranged in coaxial relation to the secondary shaft, so that the rotor shaft can be coupled with the driving gear in the absence of a transmission unit or the like.

According to another advantageous feature of the present invention, the primary-shaft coupling device and/or the secondary-shaft coupling device can be configured as a synchronized clutch. Hereby, it is to be understood that in the first switching state of the respective coupling device, the respective gear is fully disengaged from the shaft, while in the second switching state the respective gear is operatively connected by interference fit and/or form fit with the pertaining shaft. Changing from the first switching state to the second switching state should be in synchronism, i.e. the rotation speeds of the respective gear and the pertaining shaft should match before full engagement. This may be realized, for example, by a synchronizing ring or the like.

According to another advantageous feature of the present invention, the transmission unit may be configured as a single-clutch transmission, or multi-clutch transmission, or automatic transmission. When a single-clutch transmission is involved, the first drive unit can be coupled via only a single clutch, e.g. a starting clutch, with the primary shaft. When a multi-clutch transmission is involved, several clutches, suitably two clutches, can be provided between the first drive unit and each primary shaft of the transmission unit. The transmission unit has in this case as many primary shafts as there are clutches, for example.

Each primary shaft is hereby operatively connected via at least one gear pair with the secondary shaft, with the gear ratios of the various travel gears being associated to these gear pairs, respectively. For example, the gear pairs of all odd travel gears are associated to a first one of the primary shafts, and the gear ratios of all even travel gears are associated to a second one of the primary shafts. Such a configuration enables a rapid and substantially smooth change between the travel gears. Of course, the transmission unit may also be configured as an automatic transmission, in particular with a torque converter.

According to another advantageous feature of the present invention, the driving gear and the output gear can be associated to a travel gear of the transmission unit. The driving gear and the output gear are therefore not only provided to couple the second drive unit with the primary shaft and/or secondary shaft. Rather, the driving gear and the output gear enable realization of the gear ratio of a travel gear of the transmission unit, for example when the second drive unit is deactivated.

According to another advantageous feature of the present invention, the gear pair can have a first gear disposed in coaxial relation to the primary shaft, and a second gear disposed in coaxial relation to the secondary shaft, with one of the first and second gears being rigidly connected to one of the primary and secondary shafts, while the other one of the first and second gears is coupleable by a coupling device with the other one of the primary and secondary shafts. The gear pair thus realizes the travel gear or one travel gear of the transmission unit. For example, the first gear is rigidly connected with the primary shaft, whereas the second gear in coaxial relation to the secondary shaft can be coupled, suitably rigidly, with the secondary shaft via the coupling device. As an alternative, the second gear may, of course, be rigidly connected with the secondary shaft, whereas the first gear is rotatably mounted in relation to the primary shaft and can be coupled with the primary shaft via the coupling device. Advantageously, the coupling device can be a synchronized clutch.

According to another advantageous feature of the present invention, a transmission can be provided to connect the second drive unit with the driving gear. While the operative connection between the second drive unit and the driving gear can be directly established, as described above, it is possible to provide the transmission in the operative connection. The provision of the transmission realizes between the second drive unit and the driving gear a gear ratio which is different from one. The transmission may be constructed as a manually operated transmission that allows shifting into several different gear ratios.

According to another aspect of the present invention, a method of operating a drive device having a primary shaft and a secondary shaft includes operatively connecting a drive unit with a driving gear in coaxial relation to the secondary shaft, meshing the driving gear with an output gear in coaxial relation to the primary shaft, allowing the driving gear to be coupled directly with the secondary shaft, and allowing the output gear to be coupled directly with the primary shaft.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 is a schematic illustration of a drive device according to the present invention.

DETAILED DESCRIPTION OF PREFERRED EMBODIMENTS

The depicted embodiment is to be understood as illustrative of the invention and not as limiting in any way. It should also be understood that the FIGURE may not necessarily be to scale. In certain instances, details which are not necessary for an understanding of the present invention or which render other details difficult to perceive may have been omitted.

Turning now to FIG. 1, there is shown a schematic illustration of a drive device according to the present invention, generally designated by reference numeral 1. The drive device 1 includes a first drive unit 2, e.g. an internal combustion engine, a second drive unit 3, e.g. an electric machine, and a transmission unit 4 which has a primary shaft 5 and a secondary shaft 6. The primary shaft 5 can be coupled or operatively connected with the first drive unit 2 by a clutch 7, e.g. a starting clutch. Thus, the first drive unit 2 directly drives the primary shaft 5, whereas the secondary shaft 6 can be driven by the first drive unit 2 merely indirectly via the primary shaft 5.

The transmission unit 4 further includes a driving gear 8 and an output gear 9. The driving gear 8 is arranged coaxially to the secondary shaft 6, while the output gear 9 is arranged coaxially to the primary shaft 5. For example, the driving gear 8 can be rotatably mounted on the secondary shaft 6, and the output gear 9 can be rotatably mounted on the primary shaft 5. The driving gear 8 is operatively connected with the second drive unit 3, advantageously rigidly and/or permanently. Thus, the driving gear 8 has a same rotation speed as the second drive unit 3 at all times. As the output gear 9 is in permanent engagement with the driving gear 8, the output shaft 9 is also permanently operatively connected via the driving gear 8 with the second drive unit 3.

Although not shown in detail, it is also conceivable to provide a transmission, via which the second drive unit 3 can be operatively connected with the driving gear 8. The provision of the transmission realizes between the second drive unit 3 and the driving gear 8 a gear ratio which is different from one. The transmission may be constructed as a manually operated transmission that allows shifting into several different gear ratios.

Associated to the driving gear 8 is a secondary-shaft coupling device 10 and associated to the output gear 9 is a primary-shaft coupling device 11. The driving gear 8 is in fixed rotative engagement with the secondary shaft 6 via the secondary-shaft coupling device 10. Likewise, the output gear 9 is in fixed rotative engagement with the primary shaft 5 via the primary-shaft coupling device 11. Both the secondary-shaft coupling device 10 and the primary-shaft coupling device 11 are each switchable between a first switching state and a second switching state. In the first switching state of the secondary-shaft coupling device 10, the driving gear 8 is fully disengaged from the secondary shaft 6. In the second switching state of the secondary-shaft coupling device 10, the driving gear 8 is connected or coupled in fixed rotative engagement with the secondary shaft 6.

In the first switching state of the primary-shaft coupling device 11, the output gear 9 is fully disengaged from the primary shaft 5. In the second switching state of the primary-shaft coupling device 10, the output gear 9 is connected or coupled in fixed rotative engagement with the primary shaft 5. The transmission unit 4 can have at least one gear pair or, as shown by way of example in FIG. 1, two gear pairs, generally designated by reference numerals 12 and 13, respectively. The gear pair 12 has a first gear 14 and a second gear 16, and the gear pair 13 has a first gear 15 and a second gear 17. The first gear 14 of the gear pair 12 is rotatably mounted in relation to the primary shaft 5 and can be coupled to the primary shaft 5 by a coupling device 18. The second gear 16 of the gear pair 12 is rigidly connected with the secondary shaft 6. The first gear 15 of the gear pair 13 is rigidly connected to the primary shaft 5, whereas the second gear 17 is rotatably mounted in relation to the secondary shaft 6.

The second gear 17 can be operatively connected or coupled in fixed rotative engagement with the secondary shaft 6 by a coupling device 19. The gear pairs 12, 13 have gear ratios that differ from each other and are associated to different travel gears of the transmission unit 4. Also the driving gear 8 and the output gear 9 may form a gear pair 20 and may be associated to a travel gear. In this case, the gear pair 20 has a ratio which differs from the gear rations of the gear pairs 12, 13. Of course, any number of gear pairs 12, 13 may basically be provided, for example also only a single gear pair 12 or 13 or more that two gear pairs 12, 13.

The drive device 1 and the transmission unit 4 can be operated in various operating modes. For example, in a first operating mode, the second drive unit 3 is in operative connection with the primary shaft 5 via the driving gear 8 and the output gear 9 by opening the secondary-shaft coupling device 10 and closing of the primary-shaft coupling device 11. When closing one of the coupling devices 18, 19 at the same time, torque generated by the second drive unit 3 is provided to the secondary shaft 6. Suitably, the clutch 7 is opened so that the torque provided to the secondary shaft 6 is generated solely by the second drive unit 3.

In a second operating mode, the primary-shaft coupling device 11 is opened and the secondary-shaft coupling device 10 is closed. Suitably, the clutch 7 is opened at the same time. As a result, the second drive unit 3 is in direct operative connection with the secondary shaft 6 and is able to drive it.

In a third operating mode, the first drive unit 2 should be started or tow-started by the second drive unit 3. For this purpose, the coupling devices 18, 19 are opened, whereas the primary-shaft coupling device 11 and the clutch 7 are closed. None of the drive units 2, 3 is hereby in operative connection with the secondary shaft 6. Rather, the second drive unit 3 only tow-starts here the first drive unit 2.

In a fourth operating mode, the drive units 2, 3 should provide electric energy. Both the clutch 7 and the primary-shaft coupling device 11 are again closed, whereas the secondary-shaft coupling device 10 and the coupling devices 18, 19 are opened. As a result, the second drive unit 3 can be driven by the first drive unit 2 and operated as a generator to produce electric energy, e.g. for charging an energy accumulator.

In a fifth operating mode, both drive units 2, 3 are intended to provide a torque to the secondary shaft 6. In this case, one of the coupling device 18, 19 is closed for example, while the other one of the coupling device 18, 19 is opened. At the same time, the secondary-shaft coupling device 10 is used to directly operatively connect the second drive unit 3 with the secondary shaft 6.

In a sixth operating mode, the torque to be provided at the secondary shaft 6 should solely be generated by the first drive unit 2. For this purpose, only one of the coupling devices 18, 19 is closed, while the other one of the coupling device 18, 19 and both the secondary-shaft coupling device 10 and the primary-shaft coupling device 11 are opened.

With a drive device 1 according to the present invention and the transmission unit 4, various operating modes can be implemented in a simple manner and wide range of applications. In addition, the number of shafts, via which a combined torque that is jointly produced by the drive units 2, 3 has to be transmitted, can be reduced. Moreover, the particular linkage of the second drive unit 3 to the transmission unit 4 enables a flexible arrangement.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A drive device, comprising:
   a first drive unit;
   a second drive unit;
   a transmission unit including a primary shaft for connection to the first drive unit, a secondary shaft, and at least one gear pair via which the primary and secondary shafts are operatively connectable to one another;
   a driving gear mounted in coaxial relationship to the secondary shaft and operatively connected to the second drive unit;
   an output gear mounted in coaxial relationship to the primary shaft and meshing with the driving gear;
   a secondary-shaft coupling device configured to couple only the driving gear directly with the secondary shaft; and
   a primary-shaft coupling device configured to couple only the output gear directly with the primary shaft.

2. The drive device of claim 1, wherein the secondary-shaft coupling device is configured to fully disengage the driving gear from the secondary shaft in a first switching state, and to engage the driving gear with the secondary shaft in a second switching state.

3. The drive device of claim 2, wherein the secondary-shaft coupling device is configured to rigidly engage the driving gear with the secondary shaft in the second switching state.

4. The drive device of claim 1, wherein the primary-shaft coupling device is configured to fully disengage the output gear from the primary shaft in a first switching state, and to engage the output gear with the primary shaft in a second switching state.

5. The drive device of claim 4, wherein the primary-shaft coupling device is configured to rigidly engage the output gear with the primary shaft in the second switching state.

6. The drive device of claim 1, wherein the first drive unit is constructed as an internal combustion engine and/or the second drive unit is constructed as an electric machine.

7. The drive device of claim 6, wherein the electric machine includes a rotor shaft arranged in coaxial relation to the secondary shaft.

8. The drive device of claim 1, wherein at least one of the primary-shaft coupling devices and secondary-shaft coupling device is configured as a synchronized clutch.

9. The drive device of claim 1, wherein the transmission unit is configured as a single-clutch transmission, or multi-clutch transmission, or automatic transmission.

10. The drive device of claim 1, wherein the driving gear and the output gear are associated to a travel gear of the transmission unit.

11. The drive device of claim 1, wherein the gear pair has a first gear disposed in coaxial relation to the primary shaft, and a second gear disposed in coaxial relation to the secondary shaft, with one of the first and second gears being rigidly connected to one of the primary and secondary shafts, and further comprising a coupling device configured to couple the other one of the first and second gears with the other one of the primary and secondary shafts.

12. The drive device of claim 1, further comprising a transmission configured to connect the second drive unit with the driving gear.

* * * * *